Patented July 28, 1925.

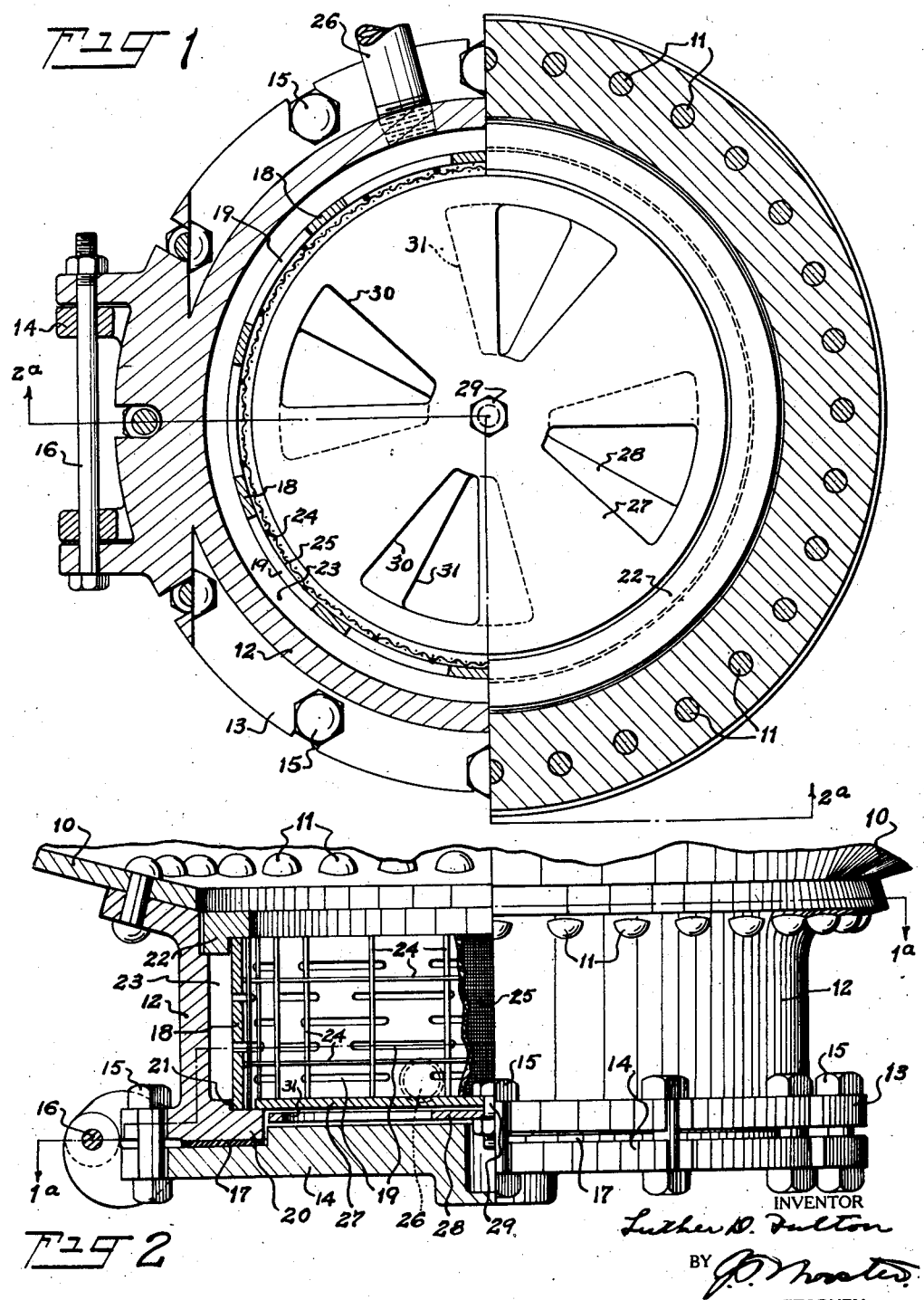

1,547,315

UNITED STATES PATENT OFFICE.

LUTHER D. FULTON, OF TITUSVILLE, PENNSYLVANIA, ASSIGNOR OF ONE-HALF TO HAROLD S. BELL, OF NEW YORK, N. Y.

OIL FILTER AND THE LIKE.

Application filed January 15, 1924. Serial No. 686,277.

*To all whom it may concern:*

Be it known that I, LUTHER D. FULTON, a citizen of the United States, and resident of Titusville, in the county of Crawford and State of Pennsylvania, have invented certain new and useful Improvements in Oil Filters and the like, of which the following is a specification.

This invention relates to oil filters and has for its object to provide improved means for retaining the filter material; to increase the speed and convenience of cleaning and renewal of filter material; and to lessen the frequency and duration of shutdowns.

A usual way in which the filtering material is retained is by a textile canvas, blanket, or other cloth, near but spaced from the bottom of the containing tank and secured to the tank inside its circumference, as by a clamping device. Such devices are objectionable because the supporting cloth tends to rot or break, causing shut downs. To renew the cloth takes considerable time and effort in properly adjusting and fastening it inside the tank where not easily accessible.

According to this invention, the use of textile fabric to retain the filter material such as clay, fuller's earth, etc., is done away with by a novel arrangement of wire screen in conjunction with a clay dumping mechanism whereby the foregoing objections are overcome. Another feature of this invention is the provision of a removable gate adjacent the bottom of the tank, whereby the clay is prevented from falling out on opening the cover but may be emptied when desired. The cover may be removed to afford access to the wire screen for brushing.

In the accompanying drawing:

Figure 1 is a cross section plan on the line 1ª—1ª of Fig. 2,

Fig. 2 is a section on the line 2ª—2ª of Fig. 1.

The filter tank for oil and the like and containing the clay, fuller's earth, or other filter medium, is of the usual form and has only a portion of its bottom shown in the drawing by the numeral 10. Secured to the bottom of the tank by rivets 11 is the extension ring 12 having a lower outer flange 13 to which cover 14 is secured by bolts 15 removable through the open slots shown. The cover 14 may be hinged to the pin 16 secured to the ring 12 for convenience in opening and closing. A gasket 17 or other packing may be inserted in the position indicated to prevent leakage.

The retainer which keeps the filter material out of the filtrate chamber comprises the supporting ring 18 to which is secured, preferably by soldering at the top and bottom, a large mesh 24 about 3" x 3", for example, and of galvanized wire, and also a small wire screen 25 preferably about #80 mesh and of 26 gauge Monel metal or the like. The screen 25 is also soldered to the ring and large mesh at the top and bottom. The large mesh serves as a spacing and supporting means for the small mesh whereby the filtrate may pass through the small mesh and thence through the perforations 19 in the ring 18. A substantial construction, such as that illustrated, is necessary because of the large pressures met with and the fact that the small wire mesh could not suitably withstand these pressures were it not supported and strengthened in some such manner as that illustrated. The filtrate chamber 23 is closed at the top by the shouldered ring 22. The bracing ring 18 is supported by an inwardly extending flange 20 in the lower end of the extension ring 12 and is maintained in spaced relation by the shoulder 21. The ring 22 spaces the bracing ring 18 at the top. The filtrate is drawn off from the chamber 23 through the pipe 26 threaded into the side of the extension ring 12.

Also resting on the flange 20 is a shutter type gate comprising upper and lower plates 27 and 28 secured together by the bolt 29 and provided with perforations 30 and 31 which are adapted to register or not according to the relative angular position of the plates 27 and 28. By rotating the lower plate 28 so that its perforations 31 are under the perforations 30 in the upper plate the clay or other filter material may be withdrawn whenever necessary to clean or renew the filter. If it be necessary to clean the fine wire mesh 25 the gate may be moved upwardly into the tank whereby the fine mesh is conveniently accessible to be brushed or otherwise cleaned. If desired the plates 27 and 28, constituting the gate may be additionally supported by the cover 14 when the tank is filled with liquid and the pressure might unduly flex these plates. Pressure of filter material is borne entirely by the top plate 27 since the lower plate 28 is not supported, and the only pressure to which it is subjected is that which reaches it through the perforations 30 of the upper plate. When the head of liquid in the tank has been removed the only pressure on the clay gate is that due to the filtering medium and after removing the cover 14 the clay gate retains the filter material inside the tank and extension ring until the lower plate 28 is rotated for withdrawal of the clay or other filter material.

The extension ring 12 is adapted to be applied to existing tanks by means of the rivets 11. Such is preferably done with the retainer, gate, and spacing ring 22 in position, although if the tank have a large opening at the top or elsewhere these three removable parts may be inserted after the extension ring is in place.

Among the advantages of this invention may be mentioned the fine wire mesh being formed of Monel metal which does not corrode or require renewal and does not break necessitating shutdowns. The location of the fine wire mesh out of the way of movement of the filter material in passing out of the tank and the arrangement of the gate structure both contribute to the quick removal of the filter material whereby less time is consumed in cleaning the filter and renewing the filter material than was necessary in the previously mentioned devices. The supporting ring for the fine wire mesh may be positioned within an existing extension ring on a tank or a new extension ring may be affixed to a tank without the necessity of making additional investment to cover new tanks. The ring 18 is a casing adapted to brace the mesh against the internal pressure of the tank and the large wire mesh 24 acts as a spacing means to increase the flow of filtrate through the perforations 19.

The term "ring" as used throughout the specification is not intended to limit the parts described to a circular cross section.

I claim:

1. The combination with a filter tank provided with an opening in the lower portion, of an extension ring around said opening, means closing the end of said ring, a wire mesh within and spaced from said ring to form a filtrate chamber between said mesh and extension ring, and means for supporting said mesh within the ring while the end of said ring is open.

2. The combination with a filter tank provided with an opening in the lower portion, of an extension ring around said opening, means closing the end of said ring, a wire mesh within said ring, means for supporting said mesh, and separable means for spacing said mesh from said ring and for closing the space between the top of said ring and mesh.

3. A filter attachment comprising an extension ring, attaching means at one end of said ring, means at the opposite end of said ring to open or close the same axially, a fine wire mesh within said ring, supporting means for said mesh adapted to withstand internal pressure, and means for closing the space between the ring and mesh against the entrance of filter material and unfiltered liquid.

4. The combination with a filter tank provided with an opening in the lower portion, of an extension ring projecting outwardly from the sides of said opening, a wire mesh longitudinally arranged within and spaced from said ring to form a filtrate chamber between the mesh and ring, means for supporting said mesh within said ring, and means for axially closing or opening said ring to retain or remove filter material from the tank and ring.

5. A retainer for filter material comprising a perforated supporting ring adapted to be inserted within an extension on an oil filter tank, a fine wire mesh carried by said supporting ring on the inside, and spacing means between said mesh and ring for supporting said mesh and comprising a larger wire mesh.

6. The combination with a filter tank provided with an opening in the bottom thereof, an extension ring secured to the tank around said opening, movable means for opening and closing the lower end of said ring, an inwardly extending flange on the lower end of said ring above said closing means, a wire mesh longitudinally arranged within said ring, a supporting and bracing ring for the mesh carried by said flange and inwardly spaced from the first mentioned ring, means for drawing off filtrate from the space between the first and second mentioned rings, means for closing said space against the entrance of any filter material, and a gate between said movable closing means and the wire mesh.

7. A filter attachment comprising an extension ring, attaching means at the upper end portion thereof for securing the same to a tank, a movable closure at the lower end portion of the ring, a flange inwardly projecting from the lower end portion of the ring, a longitudinally extending wire mesh and its supporting means carried by said flange, removable means for spacing the mesh from the ring to form a filtrate chamber therebetween and for sealing the filtrate chamber against the ingress of filter material.

8. An attachment for retaining filter material within a tank comprising an extension ring provided with means for securing the same to a tank, means to open or close said ring, a wire mesh within said ring adapted to retain filter material therein, means for spacing the mesh from said ring and for supporting the same to withstand internal pressure, means for closing the space between the ring and mesh, and a gate between said mesh and second mentioned means adapted to retain any filter material within said ring when said second mentioned means is open.

9. The combination with a filter tank provided with an opening in the lower portion, of an extension ring around said opening, means closing the end of said ring, a wire mesh within and spaced from said ring to form a filtrate chamber between said mesh and extension ring, means for supporting said mesh, and a gate between said mesh and closing means.

10. The combination with a filter tank provided with an opening in the lower portion, of an extension ring around said opening, means closing the end of said ring, a wire mesh longitudinally arranged within said ring, means supporting said mesh, separable means for spacing the mesh from the ring, and for closing the space between the ring and mesh, a rotatable gate provided with an opening and located between said mesh and first mentioned means and adapted to support any filter material within said tank and ring with the first mentioned means open or to permit any filter material to run out of the tank through the ring.

11. The combination with a filter tank provided with an opening in the lower portion, of an extension ring around said opening, a flange at the top of said ring, means for securing the flange to said tank, a mesh within said ring and spaced therefrom to form a filtrate chamber between the mesh and ring, means for closing the lower end of the ring, means for supporting said mesh independently of said closing means whereby the mesh is accessible for cleaning on opening said closing means.

Signed at Rouseville, in the county of Venango and State of Penna. this 9th day of Jan. A. D., 1924.

LUTHER D. FULTON.